United States Patent
Soda et al.

(10) Patent No.: US 7,105,597 B2
(45) Date of Patent: Sep. 12, 2006

(54) RESIN AQUEOUS DISPERSION COMPOSITION

(75) Inventors: Yoshihiro Soda, Settsu (JP); Nobuyuki Tomihashi, Settsu (JP); Hiromichi Momose, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/485,152

(22) PCT Filed: Jul. 16, 2002

(86) PCT No.: PCT/JP02/07195

§ 371 (c)(1),
(2), (4) Date: Jan. 29, 2004

(87) PCT Pub. No.: WO03/011977

PCT Pub. Date: Feb. 13, 2003

(65) Prior Publication Data

US 2004/0192829 A1    Sep. 30, 2004

(30) Foreign Application Priority Data

Jul. 30, 2001  (JP) .............................. 2001-229707

(51) Int. Cl.
*C08L 1/00*  (2006.01)
(52) U.S. Cl. ...................... 524/544; 524/502
(58) Field of Classification Search ................. 524/544, 524/502
See application file for complete search history.

(56) References Cited

U.S. PATENT DOCUMENTS 3,301,807 A * 1/1967 Hoashi ........................ 524/376
6,153,688 A * 11/2000 Miura et al. ................. 524/546
6,602,846 B1 * 8/2003 Kubota et al. .............. 510/444

FOREIGN PATENT DOCUMENTS

| EP | 818489 A2 * | 1/1998 |
| EP | 818506 A1 | 1/1998 |
| EP | 818506 A1 * | 3/1998 |
| EP | 1059333 A1 | 12/2000 |
| EP | 1424366 A1 * | 6/2004 |
| JP | 11-152385 A | 6/1999 |
| JP | 2001-302963 A | 10/2001 |
| WO | WO-03/011977 A1 * | 2/2003 |

OTHER PUBLICATIONS

International Search Report for PCT/JP02/07195 dated Oct. 29, 2002.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

The present invention provides a resin aqueous dispersion composition comprising water and at least one kind of resin particle, wherein when a primary average particle of each resin particle is taken as a sphere of the same volume, a nonionic surfactant is present in the composition in an amount which occupies 75 to 95% of a theoretical void among resin particles of 26% when each resin particle is arranged in a close packed structure. The nonionic surfactant is a solvent which is substantially nonvolatile in a temperature range of up to 100° C. and evaporates or thermally decomposes at a temperature lower than the thermal decomposition temperature of the resin particles. The resin aqueous dispersion composition can be coated thickly and can prevent development of mud crack.

4 Claims, No Drawings

RESIN AQUEOUS DISPERSION COMPOSITION

TECHNICAL FIELD

The present invention relates to a resin aqueous dispersion composition, which can be applied extremely easily and smoothly and in which mud crack does not develop, when used as an aqueous dispersion composition for coating.

BACKGROUND ART

When conventional aqueous dispersion compositions for coating are coated to the surface of an object and then dried, the coating film shrinks due to evaporation of the solvent or water and cracking occurs. That is, development of mud crack often occurs.

As suggested in WO97/40112, in order to prevent mud crack, a specific polyether urethane resin is used as an auxiliary for forming film. However, although mud crack is decreased, because thermal decomposition of the urethane groups is insufficient by the baking temperature and time suitable for a fluororesin coating film, undecomposed residue remains in the coating film, causing problems such as coloring of the obtained melted coating film.

JP-A-50-8828, JP-A-51-60243 and JP-A-52-13531 suggest using depolymerizable acrylic resin particles as an auxiliary for forming film. In the aqueous dispersion compositions for coating described therein, mud crack is prevented by using acrylic resin having a low glass transition temperature to prevent mud crack and furthermore, by using butyl carbitol together as a water-soluble high boiling point solvent for plasticizing the acrylic resin and dissolving the acrylic resin by the butyl carbitol concentrated in the drying step. When the glass transition temperature of the acrylic resin is largely decreased, decomposability becomes poor and therefore using together with an oxidant is described.

The present inventors have considered prevention of mud crack by a solution from a physical viewpoint and not a chemical formulation such as adding resin as a film forming component or adding butyl carbitol. The present inventors have found that development of mud crack can be prevented by occupying a specific proportion of void, based on the filling conditions and void ratio of the resin particles of the resin aqueous dispersion composition after drying, with a nonionic surfactant having specific thermal properties, without depending on the kind and density of resin or chemical properties of a nonionic surfactant. Thus the present invention was accomplished.

DISCLOSURE OF INVENTION

That is, the present invention relates to a resin aqueous dispersion composition comprising one or at least two resin particles and water, wherein when supposing that a primary average particle of each resin particle is substituted with a sphere having the same volume, a nonionic surfactant is present in an amount which occupies 75 to 95% of the theoretical void among resin particles of 26% when each resin particle is arranged in a close packed structure (face-centered cubic lattice) and the nonionic surfactant is a solvent which is substantially volatile in a temperature range of up to 100° C. and evaporates or thermally decomposes at a temperature lower than the thermal decomposition temperature of the resin particles.

An aqueous dispersion composition wherein at least one the resin particles is fluororesin particles can be suitably provided.

Also, an aqueous dispersion composition wherein the resin particles are fluororesin particles and depolymerizable acrylic resin particles can suitably be provided.

As the nonionic surfactant, a nonionic surfactant represented by formula (I):

(wherein R is a linear or a branched alkyl group having 9 to 19 carbon atoms, preferably 10 to 16 carbon atoms; A is a polyoxyalkylene chain having 4 to 20 oxyethylene units and 0 to 2 oxypropylene units) is preferable. Of these, a nonionic surfactant which is represented by formula (II):

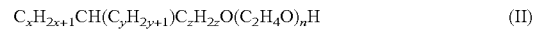

(wherein x is an integer of at least 1, y is an integer of at least 1, z is 0 or 1 and x+y+z is an integer of 8 to 18, n is an integer of 4 to 20) and has an HLB value of 9.5 to 16 and/or a nonionic surfactant represented by formula (III):

(wherein x is an integer of 8 to 18 and A is a polyoxyalkylene chain having 5 to 20 oxyethylene units and 1 or 2 oxypropylene units) is suitably used.

The content of alkylphenol, which is considered to be one kind of endocrine disrupter, is preferably kept to at most 0.1 ppm.

The resin aqueous dispersion composition of the present invention can also contain inorganic particles.

The preferable concentration of solid content is within the range of 20 to 80% by mass, more preferably 30 to 70% by mass.

BEST MODE FOR CARRYING OUT THE INVENTION

The essential features of the resin aqueous dispersion composition of the present invention comprising one or at least two resin particles and water are that (1) when supposing that each resin particle is a true sphere, a nonionic surfactant is present in an amount which occupies 75 to 95% of the theoretical void among resin particles of 26% (hereinafter referred to as occupation ratio, theoretical void standard) when each resin particle is arranged in a close packed structure and (2) the nonionic surfactant is a solvent which is substantially nonvolatile in a temperature range of up to 100° C. and evaporates or thermally decomposes at a temperature lower than the thermal decomposition temperature of the resin particles.

When the resin aqueous dispersion composition is applied and dried, water evaporates. The features (1) and (2) signify that the resin aqueous dispersion composition is prepared in advance so that the nonionic surfactant of feature (2) occupies 75 to 95% of void in the dried coating film in which water is no longer present.

That is, when supposing a system in which a nonionic surfactant is not present, water is between the resin particles in the applied aqueous dispersion composition when initially applied, but as drying (evaporation of water) progresses, voids develop between the resin particles and mud crack occurs. Development of mud crack can be prevented even after water evaporates, in the case that a nonionic surfactant occupies the space between the resin particles. On the other hand, when a nonionic surfactant such as a large amount of a nonionic surfactant is present, mud crack does not occur but shrinkage in the baking step becomes large and forming properties become poor and so too much is also problematic. The degree of occupation of the liquid substance by which mud crack can be effectively prevented is not clear until experiments are repeated.

As a result of testing, the present inventors have found that when the nonionic surfactant having thermal properties of feature (2) is present in the aqueous dispersion composition under the conditions of (1), the necessary amount of the nonionic surfactant is present between the resin particles, even after the water evaporates and the coating film is dried. Because this nonionic surfactant functions as an apparent binder, mud crack can be effectively prevented. When the content of the nonionic surfactant is too little, movement of the resin particles which occurs along with evaporation of water become noticeable and mud crack can not be effectively prevented. On the other hand, when the content is too large, shrinkage is large when decomposing and evaporating the nonionic surfactant by heating and cracking occurs. The preferable occupation ratio is 76 to 94%, more preferably 77 to 93%.

The resin particle is assumed to be a true sphere because resin particles are usually in the form of particles but are not a true sphere and in order to arrange in a close packed structure, the particles must be a true sphere. The theoretical void ratio of particles arranged in a close packed structure is 26% regardless of the particle size (occupation ratio of the resin particles is 74%). Therefore, the occupation ratio is calculated from the following equation:

$$\text{occupation ratio (\%)} = \frac{\text{amount of organic liquid (ml)}}{\frac{\text{volume of resin particles (ml)}}{0.74} \times 0.26} \times 100$$

The volume of the resin particles is calculated from the weight and specific gravity of the resin particles.

The feature (2) defines the thermal properties of the nonionic surfactant.

Being "nonvolatile in a temperature range of up to 100° C." is necessary, as development of mud crack cannot be prevented when the nonionic surfactant evaporates along with water. Also, even when the nonionic surfactant is a high boiling point solvent, there is no guarantee that the nonionic surfactant will not evaporate in the above temperature range. When evaporation occurs, mud crack occurs. Also, because the object is forming a coating film of resin, being "a nonionic surfactant which evaporates or thermally decomposes at a temperature lower than the thermal decomposition temperature of the resin particles" is necessary, as forming a coating film of resin is inhibited if the nonionic surfactant still remains at the temperature at which resin thermally decomposes.

Herein, the occupation ratio of the nonionic surfactant is based on the condition after water evaporates. That is, the condition in which the resin particles are arranged in a close packed structure is not the condition of the aqueous dispersion composition, but the condition in which the resin particles move and are packed closely with each other after water evaporates. Therefore, when another nonionic surfactant is also present, the other nonionic surfactant may evaporate along with water by heating (when drying). However, in short, the nonionic surfactant is to be present in the coating film in the above occupation ratio when drying is completed. When a step of baking for evaporating the nonionic surfactant is included as the final step and the occupation ratio is higher than a specific occupation ratio, for example, when using fluororesin, shrinkage which occurs along with decomposition and evaporation of the organic matter is too large and cracking occurs.

Below, the resin particles are described.

The kind of resin particles is not particularly limited. The particle size is also not limited. This is because the theoretical void ratio in the close packed structure does not depend on the kind and particle size of the resin, but is a constant value of 26%.

Also, in the case of mixing at least two kinds of resin particles, the theoretical void ratio does not depend on the kind or particle size of the resin particles. When mixing resin particles of different particle size, the theoretical void ratio is found by considering the packed structure of the particles separately and then the total amount of void therefrom. The reason for this lies in that, because the present invention is a composition for coating, usually at least two kinds of particles are mixed and the proportion of the two kinds is not limited. Also, because adding a thickening agent is common when necessary, small particles do not enter into the space between large particles.

In short, at least two kinds of resin particles can be filled in the closest packed structure as long as the nonionic surfactant occupies 75 to 95% of the void (theoretical void) which develops between the resin particles.

The resin particles can be one kind of resin particles. In the case of using at least two kinds of resin particles, the same kind of resin particles with different particle size, different kinds of resin particles with the same particle size or different kinds of resin particles with different particle size may be used.

Typical examples of resin particles which can suitably be used in the present invention are described below, but not limited thereto.

(Fluororesin)

Examples are PTFE particles, tetrafluoroethylene-hexafluoropropylene copolymer (FEP) particles, tetrafluoroethylene-perfluoro(alkylvinylether) copolymer (PFA) particles, ethylene-tetrafluoroethylene copolymer (ETFE) particles and ethylene-chlorotrifluoroethylene copolymer (ECTFE) particles obtained by emulsion polymerization. Of these, particles of PTFE, FEP and PFA, which are perfluoro polymers, suitably used for nonadhesive uses in kitchens and household electronic appliances, are preferably employed. The PTFE may be modified with a small amount of a comonomer. Furthermore, particles obtained by copolymerizing the same kind or different kind of monomer by seed polymerization and particles with a core-shell structure may be used.

The number average molecular weight of the fluororesin is preferably $2 \times 10^4$ to $1 \times 10^7$, particularly $2 \times 10^5$ to $8 \times 10^6$. When the number average molecular weight is less than $2 \times 10^4$, the coating film tends to become brittle and when the number average molecular weight is more than $1 \times 10^7$, the melt viscosity becomes too high and fusion of the particles tends to become difficult.

As the fluororesin particles, fine particles (fluororesin aqueous dispersion) prepared by a method such as emulsion polymerization of fluororesin monomers may be used as they are and the average particle size thereof is preferably 0.01 to 100 μm, particularly 0.1 to 5 μm. When the average particle size is less than 0.01 μm, film forming properties tend to decrease and when the average particle size is more than 100 μm, clogging tends to occur in the gun nozzle used for coating.

The aqueous dispersion of the fluororesin particles obtained by emulsion polymerization or the powdery particles obtained from this aqueous dispersion may be used. However, in the case of powder, handling properties may become poor due to electric rebound of the particles and so preferably the aqueous dispersion is used. The concentration of fluororesin solid content within the fluororesin aqueous dispersion is preferably 20 to 80% by mass, particularly 40 to 70% by mass, from the viewpoint that stability and the subsequent coating film forming properties are favorable. In the phase for preparing the aqueous dispersion composition of the present invention, the concentration of solid content can be adjusted accordingly.

(Non-fluororesin)

Acrylic resin: e.g. butyl methacrylate urethane emulsion

Polyurethane resin: e.g. urethane emulsion

Polyester resin: e.g. polyester emulsion

Polyolefin resin: e.g. polyethylene emulsion

Also, particles of PPS, PAI, PES and PEEK can be employed

Furthermore, in the case of using fluororesin particles, although ultimately not present in the fluororesin coating film, depolymerizable acrylic resin is preferably used for forming a coating, particularly for preventing development of thermal shrinkage cracking, when baking.

As described above, when baking the aqueous dispersion composition after applying and drying, the depolymerizable acrylic resin particles gradually decompose while maintaining the binder effect to fluororesin particles and so development of shrinkage crack is prevented. Therefore, the depolymerizable acrylic resin particles must be melted and begin depolymerizing at the melting point of the fluororesin or lower, must remain at least partially at the melting point of the fluororesin particles and must be decomposed and evaporated almost completely at the baking temperature.

When the dried coating film is heated, first, evaporation or decomposition and evaporation of the remnant nonionic surfactant and melting by heat of the depolymerizable acrylic resin particles begin. The nonionic surfactant must remain at least until melting by heat of the depolymerizable acrylic resin particles is completed. When the temperature rises further, as soon as evaporation or decomposition of the remnant nonionic surfactant is completed, depolymerization of the depolymerizable acrylic resin melted by heat begins. The depolymerization of the depolymerizable acrylic resin gradually starts from the melting point of the fluororesin or lower, but is not yet completed at the temperature at which the fluororesin particles begin melting by heat (melting point) and is completed when the temperature becomes the baking temperature, which is higher than the melting point of the fluororesin. As a result, a large amount of the depolymerizable acrylic resin remaining within the obtained fluororesin coating film can be avoided. Because the depolymerizable acrylic resin has viscosity when melted by heat and depolymerization progresses gradually, when the fluororesin particles melt and fuse, sudden shrinkage does not occur and development of thermal shrinkage crack can be controlled.

Therefore, the depolymerizable acrylic resin particles are preferably particles which remain until the temperature at which the fluororesin particles begin melting (melting point), even when depolymerization begins from the melting point of the fluororesin or lower, and which decompose and evaporate at the baking (processing) temperature. For example, preferable particles are particles which remain in an amount of at least 5%, particularly at least 10%, and at most 50%, preferably at most 20%, at the melting point of fluororesin (usually 240° to 345° C.), remain in an amount of at most 10%, particularly at most 5%, at the baking (processing) temperature (usually higher than the melting point of fluororesin and up to 415° C., preferably 360° to 400° C.) and substantially do not remain when baking is completed. From the above, the depolymerization (decomposition) temperature of the depolymerizable acrylic resin particles is approximately at least 200° C. and less than the baking (processing) temperature of fluororesin, particularly at most the melting point of the fluororesin. In the case of acrylic resin particles which have a depolymerization (thermal decomposition) temperature higher than the melting point of the fluororesin and which generate a large amount of decomposition gas, coating film defects such as pinholes tend to occur in the obtained coating film.

Particularly, regardless of the kind of resin, depolymerizable acrylic resin, which remains in an amount of approximately 25 to 50% in a temperature range of 300° to 320° C. and in an amount of approximately 20 to 10% in a temperature range of 330° to 345° C., is suitable, in view of balance in the function of preventing shrinkage crack and the function of preventing coloring. As long as the depolymerizable acrylic resin particles fulfill these conditions, the particles can be used, whether the fluororesin is PTFE or PFA.

Generally, regarding depolymerizability, as described in "Polym. Eng. Sci., Vol. 6, p. 273 (1966)", "Plast. Massy., Vol. 75, p. 48 (1971)" and "Deterioration of Polymer Material", Corona Publishing Co., Ltd., p. 144. (1958), C—C bonds and C—H bonds weaken the more the branches within the polymer chain and are then oxidized and decomposed, becoming easily depolymerized. More specifically preferable examples are a methacrylic homopolymer or copolymer to which a methacrylic monomer represented by formula (IV) is essential:

$$CH_2=C(CH_3)COOR \qquad (IV)$$

(wherein R is an alkyl group or a hydroxyalkyl group having 1 to 5 carbon atoms). As the methacrylic monomer, methyl methacrylate, ethyl methacrylate, propyl methacrylate, dimethyl propyl methacrylate, butyl methacrylate and pentyl methacrylate are suitably employed. Of these, a depolymerizable acrylic resin in which butyl methacrylate is used as a monomer is preferable, from the viewpoint that the glass transition temperature is low and depolymerizability (decomposition properties) is favorable.

There is no problem when a stable emulsion can be formed with a homopolymer, but from the viewpoint of stabilizing the emulsion, a monomer having a carboxyl group or a hydroxyl group can suitably be used as the comonomer.

As the depolymerizable acrylic resin particles, fine particles prepared by a method such as emulsion polymerization (depolymerizable acrylic resin emulsion) can be used as they are and the average particle size thereof is preferably 0.1 to 100 μm, particularly 0.2 to 1 μm. When the particle size is less than 0.1 μm, mud crack tends to develop and when the particle size is more than 100 μm, coating tends to become difficult.

The amount of depolymerizable acrylic resin particles is 5 to 25 parts, preferably 7 to 20 parts, more preferably 10 to 15 parts based on 100 parts of the fluororesin particles (solid content). When the amount is less than 5 parts, forming a film of fluororesin becomes difficult and when the amount is more than 25 parts, coloring of the coating film tends to occur.

The depolymerizable acrylic resin particles are preferably mixed with the other components in the form of an emulsion.

Also, elastomers are included in the range of the present invention as resin particles are, when in the form of particles.

The particle size is selected from a wide range. Usually for use in coatings, a range of 0.1 to 10 μm is suitable and one or at least two resin particles within this range are used.

The nonionic surfactant is described below.

The nonionic surfactant used in the present invention is selected from the viewpoint of the thermal properties of water and the resin particles, which are used. The basis for selecting is the above feature (2). The difference from water is that the nonionic surfactant remains nonvolatile up to 100° C. That is, when considering drying in room temperature, water evaporates but the nonionic surfactant must not evaporate and remain in the coating film and the state in which the nonionic surfactant remains even when water is no longer present must be obtained.

However, a nonionic surfactant which does not evaporate at the drying temperature (room temperature to 100° C.) is preferable, in view of economy and preparing the composition.

On the other hand, when the nonionic surfactant remains until the end when forming the resin into a film, an even and continuous coating film cannot be formed. Therefore, the nonionic surfactant must at least evaporate or thermally decompose at a temperature lower than the film forming temperature of the resin particles.

As the method for forming a film, usually, the method of forming a continuous film by melting and fusing the resin particles together by heating (baking) is common.

In the case of forming a film by heating (baking), a nonionic surfactant, which evaporates or thermally decomposes at a temperature lower than the thermal decomposition temperature of resin particles with a lower thermal decomposition temperature, is used.

In this way, the nonionic surfactant substantially depends only on the thermal properties, particularly the thermal decomposition temperature, of the resin particles which are used. However, in addition to this standard, selecting a nonionic surfactant is important, in view of imparting various chemical properties in conventional formulations.

The nonionic surfactant used in the present invention disperses the resin particles within the aqueous dispersion composition with stability and decomposes and evaporates when baked (processed) to prevent coloring in the coating film.

Examples of the nonionic surfactant are polyoxyethylene alkylphenol-type surfactants (e.g. Triton X (product name) available from Union Carbide Corporation) and polyoxyethylene alkylether-type nonionic surfactants with natural alcohol as the raw ingredient.

However, a polyoxyethylene alkylphenolether-type surfactant thermally decomposes in the baking step and generates toxic aromatic compounds (e.g. benzene, toluene, xylene) as decomposition gas, causing air pollution. Also, in an alkylphenol-type nonionic surfactant, unreacted alkylphenol (endocrine disrupting substance, i.e. endocrine disrupter) may remain in an extremely small amount. In view of the above, a nonphenol-type nonionic surfactant which does not contain a benzene ring within its structure is preferable. Particularly, regardless of its origin, the content of alkylphenol is desired to be at most 0.1 ppm, particularly to be nonexistent, in view of the environment.

An example is the polyoxyalkylene alkyl ether-type nonionic surfactant of the above formula (I) and examples of the particularly preferable nonphenol-type nonionic surfactants are the polyoxyethylene alkyl ether-type surfactants represented by the above formulas (II) or (III). In view of dispersing the fluororesin with stability, the HLB values thereof are preferably 9.5 to 16, particularly 12 to 14.

The amount to be added of the nonionic surfactant is an amount which can stabilize the dispersion state of the aqueous dispersion composition for coating of the present invention and is preferably 6 to 10% by mass, particularly 7 to 9% by mass based on the fluororesin particles.

The nonionic surfactant is a substance for stabilizing the final aqueous dispersion composition for coating and can be added in advance to the aqueous dispersion of resin particles or the emulsion of the depolymerizable acrylic resin particles or can be added after mixing these components.

In the present invention, besides the nonionic surfactant, another liquid organic compound having a hydrophilic group can also be used together, from the viewpoint of providing affinity to water and dispersing the aqueous dispersion composition with stability. As the organic compound containing a hydrophilic group, high boiling point polyol is preferable.

As the high boiling point polyol, polyol which does not contain nitrogen atoms is preferable, as little coloring is caused by thermal decomposition which occurs when baking. The preferable number of hydroxyl groups is 2 to 3. Polyol having 4 or more hydroxyl groups is often a solid in room temperature.

Examples of suitable polyols are one kind or at least two kinds of ethylene glycol (boiling point: 198° C.), 1,2-propanediol (188° C.), 1,3-propanediol (214° C.), 1,2-butanediol (190° C.), 1,3-butanediol (208° C.), 1,4-butanediol (229° C.), 1,5-pentanediol (242° C.), 2-butene-1,4-diol (235° C.), glycerin (290° C.), 2-ethyl-2-hydroxymethyl-1,3-propanediol (295° C.) and 1,2,6-hexanetriol (178° C./5 mmHg).

Also, organic solvents other than high boiling point polyol may also be used according to need, within the range in which the effects of the present invention are not lost. Examples of the organic solvent are aromatic hydrocarbon solvents such as toluene and xylene and aliphatic hydrocarbon solvents having 9 to 11 carbon atoms.

The amount of the polyol is 5 to 18 parts, more preferably 7 to 15 parts, most preferably 7 to 12 parts, based on 100 parts of the fluororesin particles (solid content). When the amount is less than 5 parts, the effect of preventing development of mud crack becomes weak and when the amount is more than 18 parts by weight, the coating film may become clouded.

Water is used as the liquid medium of the resin aqueous dispersion composition and adjusts the solid content concentration of the composition. Water can be used alone or an aqueous mixed solvent, in which water and a water-soluble compound are used together, may be used.

In the present invention, other additives such as an inorganic filler may be compounded according to need.

Examples of the inorganic filler other than pigment are mica particles, mica particles coated with pigment, metal flakes and at least two of these inorganic fillers. These may be compounded in an amount within the range in which the effects of the present invention are not lost.

As the pigment, various conventionally known pigments can be used and examples are titanium oxide, carbon black and colcothar.

The inorganic filler is a substance which imparts the function of improving abrasion resistance and of the above, mica is preferable in view of providing beautiful appearance.

The particle size of the mica particles is 10 to 100 μm, preferably 15 to 50 μm. When the particle size is less than 10 μm, abrasion resistance and photoluminescence tend to decrease and when the particle size is more than 100 μm, non-adhesion tends to decrease. Mica particles coated with pigment are obtained by adhering pigment such as $TiO_2·Fe_2O_3$ to the mica particles by sintering deposition. Examples of the metal flakes are flakes of titanium, zirconium, aluminum, zinc, antimon, tin, iron and nickel. Of these, in view of difficulty in rusting, titanium and zirconium are preferable. Regarding size, those with a size in the range usually used in coatings can be used.

Also, various other known additives may be compounded, as long as the effects of the present invention are not lost. Examples are a defoaming agent, a desiccant, a thickening agent, a leveling agent and an anticrawling agent.

Examples of the defoaming agent are toluene, xylene, a nonpolar solvent such as a hydrocarbon-type having 9 to 11 carbon atoms and silicone oil.

An example of the desiccant is cobalt oxide.

Examples of the thickening agent are methyl cellulose, polyvinyl alcohol and carboxylated vinyl polymer.

Preparation of the resin aqueous dispersion composition of the present invention can be conducted by the usual method. For example, in a resin aqueous dispersion in which resin particles are dispersed in an aqueous medium by a nonionic surfactant, a nonionic surfactant, other liquid organic compounds, an emulsion of depolymerizable acrylic resin particles and, if necessary, inorganic material and other additives are added and mixed by stirring at 5 to 30° C. for 10 to 40 minutes, to prepare the resin aqueous dispersion composition. The solid content concentration can be controlled by adding the aqueous medium.

The resin aqueous dispersion composition of the present invention is useful for a coating, particularly a topcoat coating. As the coating method, various conventional coating methods may be employed. Examples are dipping method, spray method, roll coat method, doctor blade method and flow coat method.

The composition of the present invention can be applied directly to the substrate but preferably, in order to improve adhesion, a primer layer is provided and a top coat layer is formed. The substrate is not particularly limited but various metals, porcelain enamel, glass and various ceramics can be employed. In order to improve adhesion, the surface is preferably roughened by sand blasting.

The composition which is applied to the substrate is then dried. The composition of the present invention is characterized in that mud crack does not occur at this step of drying. Drying is conducted under the usual conditions and for example, when conducted at room temperature to 80° C., more preferably 80° to 100° C., for 5 minutes to 1 hour, set to touch is achieved.

In the case of a baking-type coating such as fluororesin coating, the dried coating film is baked (processed). When depolymerizable acrylic resin is compounded, the depolymerizable acrylic resin functions as a binder until the fluororesin particles melt and fuse and so development of cracking caused by thermal shrinkage in the baking step can be prevented. The baking (processing) temperature and time differ according to the kind and melting point of the fluororesin, but baking is conducted at the melting point of fluororesin or higher, usually 360° to 415° C., for 5 to 30 minutes. In the case of PTFE, baking at 360° to 380° C. for 10 to 30 minutes is suitable.

When a primer layer is provided, the method of applying, drying and baking the primer layer and then applying, drying and baking layer the composition of the present invention (2 coat 2 bake method) or the method of applying and drying the primer layer, applying and drying the composition of the present invention and then simultaneously baking both layers (2 coat 1 bake method) may be employed.

According to the resin aqueous dispersion composition of the present invention, a thick coating film of which the film thickness of the melted coating film is at least 30 μm can be obtained by coating once. The upper limit is not particularly limited but when the coating film is too thick, various types of decomposed residue remain in the coating film, which becomes a cause of coloring, so the limit is at most 100 μm.

In the case of fluororesin coating using fluororesin particles, the composition of the present invention is most useful for metal cooking utensils, particularly for coating frying pans, but the composition can be also used for coating other products which require corrosion resistance. Examples of such products are bearings, valve, electric wires, metal foils, boilers, pipes, ship bottoms, oven linings, bottom plates of irons, bread pans, rice cookers, grill pans, electric pots, ice making trays, snow plow shovels, spades, chutes, conveyers, rolls, metal dies, dies, saws, files, tools such as a drill, kitchen knives, scissors, hoppers, other industrial containers (particularly for the semiconductor industry) and casting molds.

Hereinafter, the present invention is explained in detail by means of Examples, but the present invention is not limited thereto. In Examples and Comparative Examples, "part(s)" and "%" respectively represent "part(s) by mass" and "% by mass".

EXAMPLE 1

Each of the following components was mixed in the order given.

| | |
|---|---|
| (A) PTFE aqueous dispersion (specific gravity approximately 2.2, average particle size 0.2 μm, concentration of solid content 60%, containing 6% of polyoxyethylene tridecylether (ethyleneoxide 8.5 mole) based on PTFE as a dispersion stabilizer) | 70.0 parts |
| (B) emulsion of depolymerizable acrylic resin particles (specific gravity approximately 1.1, butyl acrylate resin, average particle size 0.6 μm, concentration of solid content 40%) | 12.6 parts |
| (C) nonionic surfactant (specific gravity 1.0) nonionic surfactant (polyoxyethylene tridecylether, Dispanol TOC available from NOF Corporation (50% aqueous solution)) | 7.9 parts |
| (D) Other additives | |
| glycerin | 3.1 parts |
| hydrocarbon solvent | 1.3 parts |
| water | 5.1 parts |

Regarding the obtained resin aqueous dispersion composition of the present invention, the following properties were examined. The results are shown in Table 1. The occupation ratio of the total amount of the nonionic surfactant was 80%.

(Viscosity)

The viscosity at 25° C. was measured by a B-type rotating viscometer.

(Storage Stability)

500 g of the aqueous dispersion composition for coating was placed in a bottle made of polyethylene and left for 6 months in a constant bath of 40° C. The storage stability is measured by redispersability.

Evaluation was conducted using a metal net of 150 mesh and those which completely passed through were evaluated as ○ and those leaving residue on the metal net were evaluated as X.

Then, the obtained aqueous dispersion composition for coating was applied by spraying to a non-blast aluminum board and dried at room temperature for 30 hours and then dried further for 1 hour at 80° C. The surface of the obtained dried coating film was observed by an optical microscope to examine whether or not mud crack had developed. Mud crack was not found.

The dried coating film was baked for 20 minutes at a temperature of 380° C. to form a melted coating film. The critical coating thickness for crack of the coating film was examined. The results are shown in Table 1.

(Critical Coating Thickness for Crack)

The coating film thickness was variously changed and the coating film thickness at which crack begins to develop was assumed to be the critical crack coating thickness.

(Content of Alkylphenol)

The content of alkylphenol was analyzed by liquid chromatography (column: ASAHIPAC GS-310, eluent: acetonitrile/water=50/50 volume ratio, flow rate: 1.2 ml/min, column temperature: 25° to 28° C., detection: UV (230 nm)). Those from which ultraviolet rays were not detected were evaluated as ○ and those from which ultraviolet rays were detected were evaluated as x.

EXAMPLE 2

| | |
|---|---|
| (A) PTFE aqueous dispersion (specific gravity approximately 2.2, average particle size 0.2 μm, concentration of solid content 60%, containing 6% of polyoxyethylene tridecylether (ethyleneoxide 8.5 mole) based on PTFE as a dispersion stabilizer) | 60.8 parts |
| (B) emulsion of depolymerizable acrylic resin particles (specific gravity approximately 1.1, butyl acrylate resin, average particle size 0.6 μm, concentration of solid content 40%) | 10.9 parts |
| (C) mill base of titanium oxide (40%) composition of mill base | 13.7 parts |
| titanium oxide particles (specific gravity approximately 3.9, particle size 0.35 μm) | 5.5 parts |
| Dispanol TOC (undiluted solution) | 1.1 parts |
| water | 7.1 parts |
| (D) nonionic surfactant (specific gravity 1.0) nonionic surfactant (polyoxyethylene tridecylether, Dispanol TOC available from NOF Corporation (50% aqueous solution)) | 6.9 parts |

-continued

| | |
|---|---|
| (E) Other additives | |
| glycerin | 2.7 parts |
| hydrocarbon solvent | 1.1 parts |
| water | 3.9 parts |

The present composition was prepared in the same manner as in Example 1. The properties of this composition were examined in the same manner as in Example 1. The results are shown in Table 1. The occupation ratio of the total amount of the nonionic surfactant was 88%.

Then, the composition for coating was applied by spraying to a non-blast aluminum board and dried and baked under the same conditions as in Example 1 to form a melted coating film. The same properties of the coating film as in Example 1 were examined. The results are shown in Table 1.

COMPARATIVE EXAMPLES 1 TO 5

The composition of the present invention was prepared in the same manner as in Example 1 except that each of the components shown in Table 1 was used in the ratio shown in Table 1. The properties of the compositions were examined in the same manner as in Example 1. The results are shown in Table 1.

Then, the obtained aqueous dispersion was applied by spraying to a non-blast aluminum board and dried and baked under the same conditions as in Example 1 to form a melted coating film. The same properties of the coating film as in Example 1 were examined. The results are shown in Table 1.

Comparative Example 1 is an example in which the amount of nonionic surfactant added later in Example 1 was small. The occupation ratio of the total amount of the nonionic surfactant was 60%.

Comparative Example 2 is a compounding example in which film forming properties were imparted to the acrylic resin by adding butyl carbitol instead of glycerin. The occupation ratio of the total amount of the nonionic surfactant was 63%.

Comparative Example 3 is an example in which a polyoxyethylenealkylphenol surfactant (Triton X100, available from Union Carbide Corporation) was used as the nonionic surfactant in Comparative Examples 2. The occupation ratio of the total amount of the nonionic surfactant was 63%.

Comparative Examples 4 and 5 are examples in which the amount of the nonionic surfactant was increased. The occupation ratio of the total amount of the nonionic surfactant was 109% in Comparative Example 4 and 131% in Comparative Example 5.

TABLE 1

| Composition | Specific Gravity of Particles | | Ex. 1 | Ex. 2 | Com. Ex. 1 | Com. Ex. 2 | Com. Ex. 3 | Com. Ex. 4 | Com. Ex. 5 |
|---|---|---|---|---|---|---|---|---|---|
| PTFE Aqueous Dispersion (60%) | | | | | | | | | |
| PTFE Particles | Particle size 0.2 μm | Approximately 2.2 g | 42.0 | 36.5 | 41.9 | 42.2 | 42.2 | 40.7 | 40.0 |
| Dispanol TOC (a) | | g | 2.5 | 2.2 | 2.5 | 2.5 | 2.5 | 2.4 | 2.4 |
| Deionized Water | | g | 25.5 | 22.1 | 25.4 | 25.6 | 25.6 | 24.6 | 24.2 |
| Total | | g | 70.0 | 60.8 | 69.8 | 70.3 | 70.3 | 67.7 | 66.6 |

TABLE 1-continued

| Composition | | Specific Gravity of Particles | | Ex. 1 | Ex. 2 | Com. Ex. 1 | Com. Ex. 2 | Com. Ex. 3 | Com. Ex. 4 | Com. Ex. 5 |
|---|---|---|---|---|---|---|---|---|---|---|
| Acrylic Aqueous Dispersion (40%) | | | | | | | | | | |
| Acrylic Particles | Particle size 0.6 μm | Approximately 1.1 | g | 5.0 | 4.4 | 5.0 | 4.2 | 4.2 | 4.1 | 4.0 |
| Deionized Water | | | g | 7.6 | 6.5 | 7.6 | 6.3 | 6.3 | 6.1 | 6.0 |
| Total | | | g | 12.6 | 10.9 | 12.6 | 10.5 | 10.5 | 10.2 | 10.0 |
| Titanium Oxide Mill base (40%) | | | | | | | | | | |
| Titanium Oxide Particles | Particle size 0.35 μm | Approximately 3.9 | g | | 5.5 | | | | | |
| Dispanol TOC (b) | | | g | | 1.1 | | | | | |
| Deionized Water | | | g | | 7.1 | | | | | |
| Total | | | g | | 13.7 | | | | | |
| Dispanol TOC (50% Aqueous Solution) (c) | | | g | 7.9 | 6.9 | 4.2 | 5.0 | | 12.2 | 15.2 |
| Triton x 100 (50% Aqueous Solution) (d) | | | | | | | | 5.0 | | |
| Glycerin | | | g | 3.1 | 2.7 | 3.1 | | | | |
| Butyl Carbitol | | | g | | | | 9.5 | 9.5 | 9.1 | 8.2 |
| Hydrocarbon Solvent | | | g | 1.3 | 1.1 | 1.3 | | | | |
| Deionized Water | | | g | 5.1 | 3.9 | 9.0 | 4.7 | 4.7 | 0.8 | |
| Total | | | g | 100.0 | 100.0 | 100.0 | 100.0 | 100.0 | 100.0 | 100.0 |
| Solid Content | | | wt % | 42.0 | 42.0 | 41.9 | 42.2 | 42.2 | 40.7 | 42.2 |
| Viscosity | | | cP | 230 | 350 | 220 | 230 | 230 | 260 | 280 |
| Storage Stability | | | | ○ | ○ | ○ | X | X | ○ | ○ |
| Amount of Nonionic Surfactant Necessary for Filling Void (Theoretical Value) | | | g | 8.3 | 7.7 | 8.3 | 8.0 | 8.0 | 7.8 | 8.0 |
| Total of Nonionic Surfactant (a) to (d) (Content) | | | g | 6.6 | 6.8 | 5.0 | 5.0 | 5.0 | 8.5 | 10.5 |
| Occupation Ratio of Nonionic Surfactant Amount to Theoretical Void | | | % | 80 | 88 | 60 | 63 | 63 | 109 | 131 |
| Mud Crack | | | | No | No | Yes | Yes | Yes | No | No |
| | | | | at least | at least | | | | | |
| Critical Film Thickness for Crack | | | μm | 100 | 100 | 25 | 30 | 30 | 10 | 5 |
| Presence of Endocrine Disrupter | | | | ○ | ○ | ○ | ○ | X | ○ | ○ |

The specific gravity of Dispanol TOC and Triton x 100 is approximately 1.0.

As evident from Table 1, in the composition of the present invention, in which the occupation ratio of the nonionic surfactant is within the range of 75 to 95%, mud crack does not occur and a thick film can be obtained by baking.

INDUSTRIAL APPLICABILITY

The resin aqueous dispersion composition of the present invention can be coated thickly and can prevent development of mud crack.

The invention claimed is:

1. A resin aqueous dispersion composition comprising water and at least two kinds of resin particles which contain fluororesin particles and depolymerizable acrylic resin particles,
    wherein when a primary average particle of each resin particle is taken as a sphere of the same volume, a nonionic surfactant is present in the composition in an amount which occupies 75 to 95% of a theoretical void among resin particles of 26% when each resin particle is arranged in a close packed structure;
    said nonionic surfactant is a solvent which is substantially nonvolatile in a temperature range of up to 100° C. and evaporates or thermally decomposes at a temperature lower than the thermal decomposition temperature of said resin particles; and
    said depolymerizable acrylic resin particles are a methacrylic homopolymer or copolymer to which a methacrylic monomer represented by formula (IV) is essential:

$$CH_2=C(CH_3)COOR \qquad (IV)$$

(wherein R is an alkyl group or a hydroxyalkyl group having 1 to 5 carbon atoms) and are melted and begin depolymerizing at the melting point of said fluororesin particles or lower, remain at least partially at the melting point of said fluororesin particles and decomposed and evaporated almost completely at the baking temperature, preventing development of shrinkage crack when baking said resin aqueous dispersion composition after applying and drying.

2. The aqueous dispersion composition of claim 1, wherein said nonionic surfactant is a nonionic surfactant represented by formula (I):

R—O—A—H (wherein R is a linear or a branched alkyl group having 9 to 19 carbon atoms, preferably 10 to 16 carbon atoms; A is a polyoxyalkylene chain having 4 to 20 oxyethylene units and 0 to 2 oxypropylene units).

3. The aqueous dispersion composition of claim 1, which further comprises inorganic particles.

4. The aqueous dispersion composition of claim 1, wherein concentration of solid content is 10 to 70% by mass.

* * * * *